(12) United States Patent
Shanmugam et al.

(10) Patent No.: US 11,169,914 B1
(45) Date of Patent: Nov. 9, 2021

(54) SYSTEM FOR SYNCHRONIZATION AND PROVISIONING OF ELECTRONIC TESTING DATA ACROSS APPLICATIONS

(71) Applicant: Bank of America Corporation, Charlotte, NC (US)

(72) Inventors: Parthiban Tiruvayur Shanmugam, Charlotte, NC (US); Miriam Levinsohn, Dallas, TX (US); Rusk Jacob, Frisco, TX (US); Durga Prasad Turaga, Murphy, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/918,595

(22) Filed: Jul. 1, 2020

(51) Int. Cl.
*G06F 11/36* (2006.01)

(52) U.S. Cl.
CPC ...... *G06F 11/3696* (2013.01); *G06F 11/3636* (2013.01); *G06F 11/3664* (2013.01); *G06F 11/3684* (2013.01)

(58) Field of Classification Search
CPC . G06F 11/30–3495; G06F 11/36–3696; G06F 16/178–1794; G06F 16/27–278
See application file for complete search history.

(56) References Cited

U.S. PATENT DOCUMENTS

| | | | |
|---|---|---|---|
| 7,260,630 B1 * | 8/2007 | Mongiovi | H04L 41/0213 709/224 |
| 8,094,647 B2 | 1/2012 | Elliott et al. | |
| 8,566,648 B2 * | 10/2013 | Schroeder | G06F 11/3672 714/38.14 |
| 8,589,537 B2 * | 11/2013 | King | G06F 11/3476 709/224 |
| 9,141,276 B2 | 9/2015 | Dawes et al. | |
| 9,160,552 B2 | 10/2015 | Taft et al. | |
| 9,213,513 B2 | 12/2015 | Hartz et al. | |
| 9,336,292 B2 | 5/2016 | McAlister et al. | |
| 9,363,156 B2 * | 6/2016 | Chandrasekharapuram | H04L 43/50 |
| 9,413,852 B2 | 8/2016 | Lawson et al. | |
| 9,503,394 B2 | 11/2016 | Marr et al. | |
| 9,658,833 B2 | 5/2017 | Heyhoe et al. | |
| 9,769,207 B2 | 9/2017 | Raleigh et al. | |
| 9,858,174 B2 | 1/2018 | Straub et al. | |
| 9,951,610 B2 | 4/2018 | Prammer | |
| 10,102,500 B2 | 10/2018 | Fung et al. | |
| 10,380,007 B2 | 8/2019 | Smith et al. | |
| 10,437,708 B2 * | 10/2019 | Kelly | G06F 16/21 |
| 10,582,001 B2 | 3/2020 | Straub | |
| 10,592,357 B2 | 3/2020 | Vijayan et al. | |
| 10,628,868 B2 | 4/2020 | Bursey | |

(Continued)

*Primary Examiner* — Todd Aguilera
(74) *Attorney, Agent, or Firm* — Michael A. Springs; Moore & Van Allen PLLC; Seongun M. Hong

(57) ABSTRACT

A system is provided for synchronization and provisioning of electronic testing data across applications. In particular, the system may continuously capture data from multiple different applications within the production environment and sanitize the data for use in the lower level testing environments. The testing data may be synchronized and/or standardized such that the testing data may be used across multiple disparate downstream test applications. In this way, the system may ensure that testing data is always available, synchronized, current, and sanitized for use by in the lower level testing environments.

17 Claims, 2 Drawing Sheets

(56) References Cited

U.S. PATENT DOCUMENTS

| | | | |
|---|---|---|---|
| 2012/0072575 A1* | 3/2012 | King | H04L 43/04 709/224 |
| 2012/0198279 A1* | 8/2012 | Schroeder | G06F 11/2294 714/32 |
| 2014/0081916 A1 | 3/2014 | McAlister et al. | |
| 2015/0172164 A1* | 6/2015 | Chandrasekharapuram | G06F 11/263 714/33 |
| 2017/0048339 A1 | 2/2017 | Straub | |
| 2018/0026867 A1 | 1/2018 | McAlister et al. | |
| 2018/0041588 A1 | 2/2018 | Straub et al. | |
| 2018/0210817 A1* | 7/2018 | Kelly | G06F 16/27 |
| 2021/0004314 A1* | 1/2021 | Emek | G06F 8/41 |

\* cited by examiner

SYSTEM FOR SYNCHRONIZATION AND PROVISIONING OF ELECTRONIC TESTING DATA ACROSS APPLICATIONS

FIELD OF THE INVENTION

The present disclosure embraces a system for synchronization and provisioning of electronic testing data across applications.

BACKGROUND

There is a need for an efficient way to provision electronic testing data.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for synchronization and provisioning of electronic testing data across applications. In particular, the system may continuously capture data from multiple different applications within the production environment and sanitize the data for use in the lower level testing environments. The testing data may be synchronized and/or standardized such that the testing data may be used across multiple disparate downstream test applications. In this way, the system may ensure that testing data is always available, synchronized, current, and sanitized for use by in the lower level testing environments.

Accordingly, embodiments of the present disclosure provide a system for synchronization and provisioning of electronic testing data across applications. The system may comprise a memory device with computer-readable program code stored thereon; a communication device; and a processing device operatively coupled to the memory device and the communication device, wherein the processing device is configured to execute the computer-readable program code to continuously retrieve production data from one or more computing systems in a production environment; execute a synchronization process on the production data; execute a sanitization process on the production data; generate testing data based on executing the synchronization process and the sanitization process on the production data; store the testing data within a testing data repository; and provision the testing data to one or more testing applications within a lower level environment.

In some embodiments, executing the synchronization process on the production data comprises retrieving a first data set from a first production application in the production environment; retrieving a second data set from a second production application in the production environment; detecting a mismatch between the first data set and the second data set; and based on detecting the mismatch, merging the first data set with the second data set to form a consolidated data set.

In some embodiments, executing the synchronization process on the production data comprises retrieving a first data set from a first production application in the production environment; retrieving a second data set from a second production application in the production environment; detecting, based on comparing the first data set with the second data set, that the first data set contains incomplete data entries; and based on detecting that the first data set contains incomplete data entries, merging the first data set with the second data set to populate the incomplete data entries.

In some embodiments, executing the sanitization process on the production data comprises detecting that one or more data entries within the production data contain sensitive information; and replacing the one or more data entries with placeholder data.

In some embodiments, provisioning the testing data comprises presenting a user interface of a data gateway to a user within the lower level environment; receiving, from the user, one or more criteria for the testing data; retrieving, via a data mining tool, a subset of the testing data corresponding to the one or more criteria; and transmitting the subset of the testing data to a testing computing system within the lower level environment.

In some embodiments, the user interface comprises one or more interface elements through which the user may provide the one or more criteria for the testing data.

In some embodiments, provisioning the testing data comprises pushing the testing data from the testing data repository to a testing computing system within the lower level environment at designated intervals.

Embodiments of the present disclosure provide a computer program product for synchronization and provisioning of electronic testing data across applications. The computer program product comprises at least one non-transitory computer readable medium having computer-readable program code portions embodied therein, the computer-readable program code portions comprising executable code portions for continuously retrieving production data from one or more computing systems in a production environment; executing a synchronization process on the production data; executing a sanitization process on the production data; generating testing data based on executing the synchronization process and the sanitization process on the production data; storing the testing data within a testing data repository; and provisioning the testing data to one or more testing applications within a lower level environment.

In some embodiments, executing the synchronization process on the production data comprises retrieving a first data set from a first production application in the production environment; retrieving a second data set from a second production application in the production environment; detecting a mismatch between the first data set and the second data set; and based on detecting the mismatch, merging the first data set with the second data set to form a consolidated data set.

In some embodiments, executing the synchronization process on the production data comprises retrieving a first data set from a first production application in the production environment; retrieving a second data set from a second production application in the production environment; detecting, based on comparing the first data set with the second data set, that the first data set contains incomplete data entries; and based on detecting that the first data set contains incomplete data entries, merging the first data set with the second data set to populate the incomplete data entries.

In some embodiments, executing the sanitization process on the production data comprises detecting that one or more data entries within the production data contain sensitive information; and replacing the one or more data entries with placeholder data.

In some embodiments, provisioning the testing data comprises presenting a user interface of a data gateway to a user within the lower level environment; receiving, from the user, one or more criteria for the testing data; retrieving, via a data mining tool, a subset of the testing data corresponding to the one or more criteria; and transmitting the subset of the testing data to a testing computing system within the lower level environment.

In some embodiments, provisioning the testing data comprises pushing the testing data from the testing data repository to a testing computing system within the lower level environment at designated intervals.

Embodiments of the present disclosure provide a computer-implemented method for synchronization and provisioning of electronic testing data across applications. The computer-implemented method may comprise continuously retrieving production data from one or more computing systems in a production environment; executing a synchronization process on the production data; executing a sanitization process on the production data; generating testing data based on executing the synchronization process and the sanitization process on the production data; storing the testing data within a testing data repository; and provisioning the testing data to one or more testing applications within a lower level environment.

In some embodiments, executing the synchronization process on the production data comprises retrieving a first data set from a first production application in the production environment; retrieving a second data set from a second production application in the production environment; detecting a mismatch between the first data set and the second data set; and based on detecting the mismatch, merging the first data set with the second data set to form a consolidated data set.

In some embodiments, executing the synchronization process on the production data comprises retrieving a first data set from a first production application in the production environment; retrieving a second data set from a second production application in the production environment; detecting, based on comparing the first data set with the second data set, that the first data set contains incomplete data entries; and based on detecting that the first data set contains incomplete data entries, merging the first data set with the second data set to populate the incomplete data entries.

In some embodiments, executing the sanitization process on the production data comprises detecting that one or more data entries within the production data contain sensitive information; and replacing the one or more data entries with placeholder data.

In some embodiments, provisioning the testing data comprises presenting a user interface of a data gateway to a user within the lower level environment; receiving, from the user, one or more criteria for the testing data; retrieving, via a data mining tool, a subset of the testing data corresponding to the one or more criteria; and transmitting the subset of the testing data to a testing computing system within the lower level environment.

In some embodiments, the user interface comprises one or more interface elements through which the user may provide the one or more criteria for the testing data.

In some embodiments, provisioning the testing data comprises pushing the testing data from the testing data repository to a testing computing system within the lower level environment at designated intervals.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
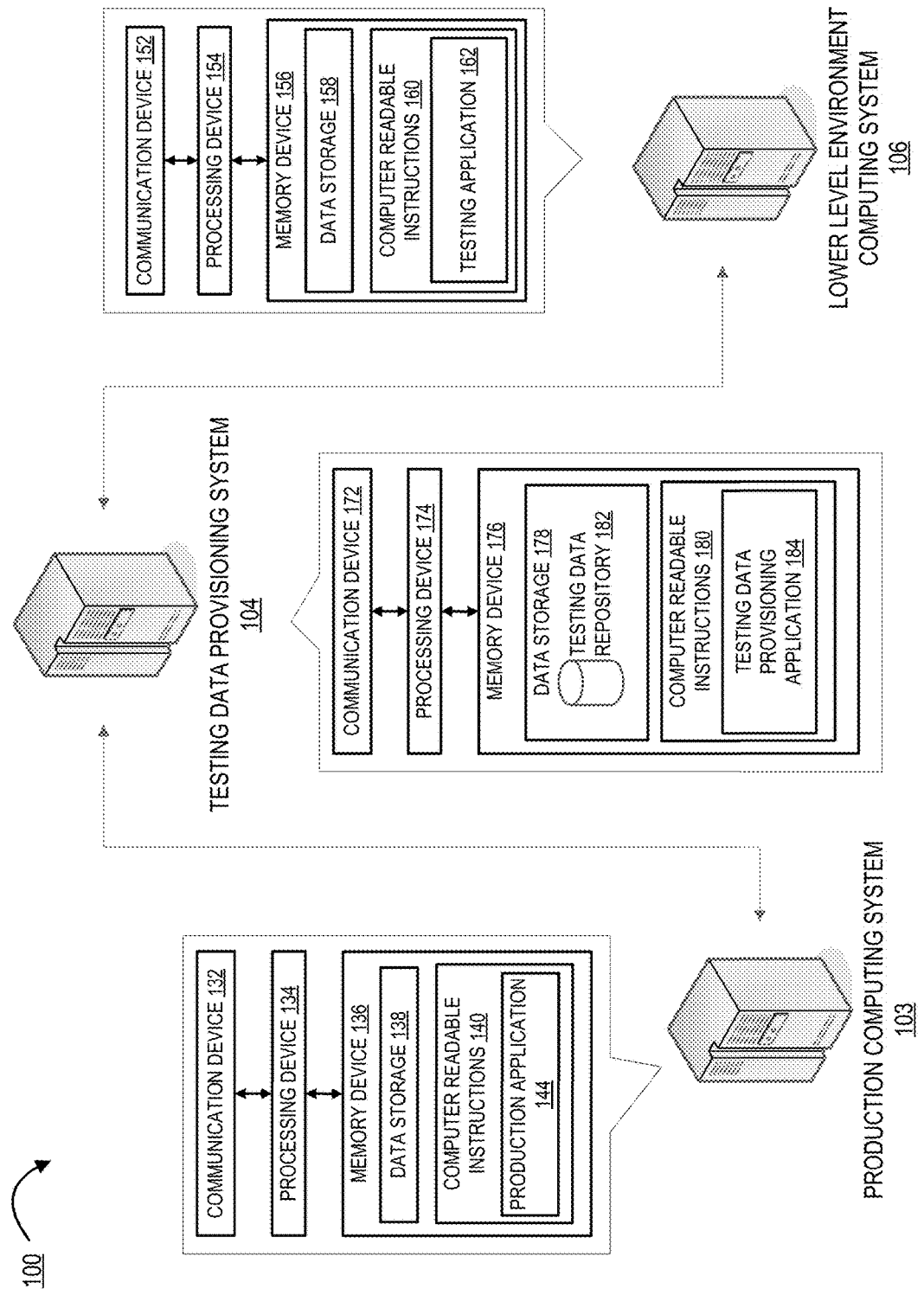
Figure 2:
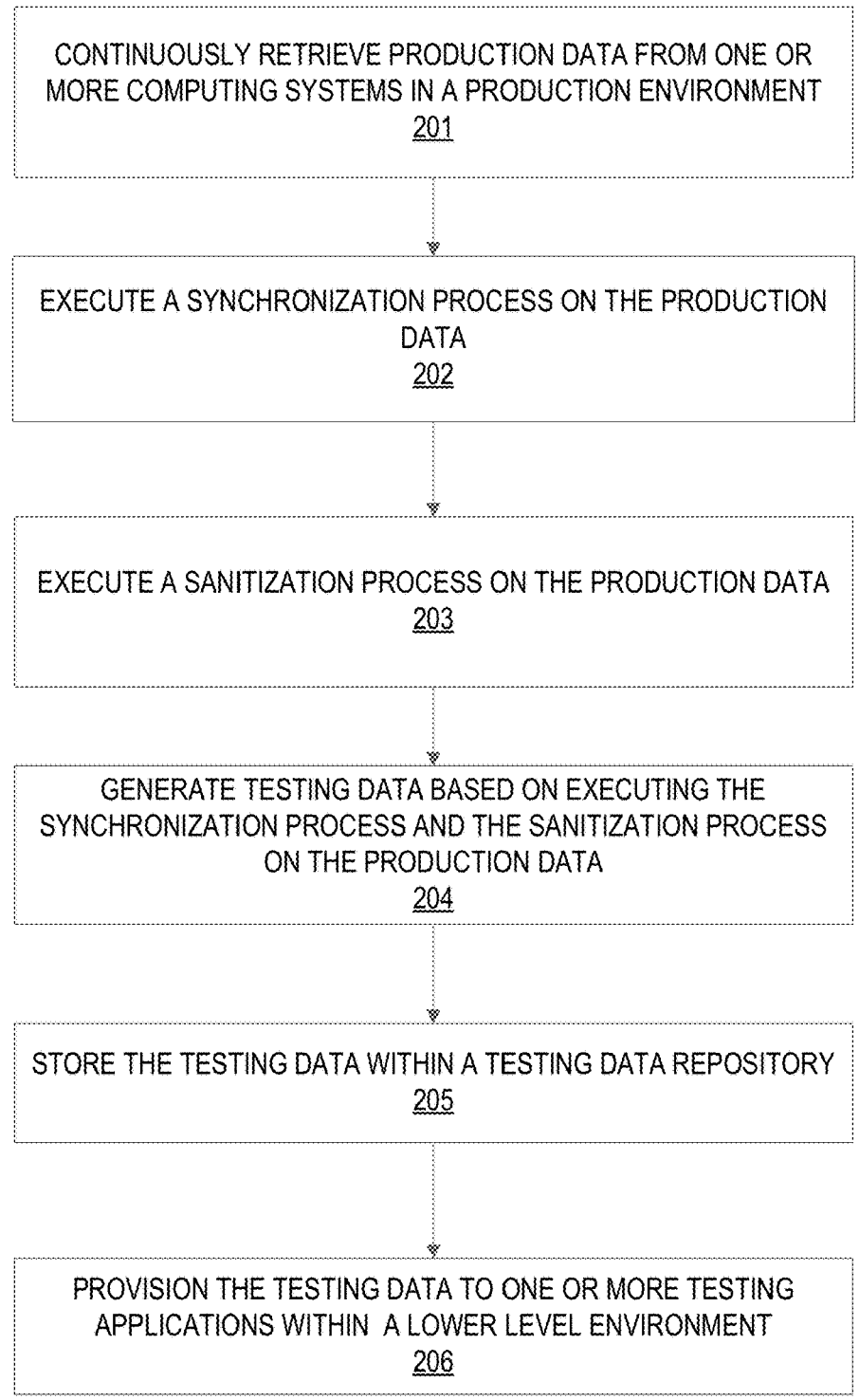

Having thus described embodiments of the invention in general terms, reference will now be made to the accompanying drawings, wherein:

FIG. 1 illustrates an operating environment for the testing data provisioning system, in accordance with one embodiment of the present disclosure; and FIG. 2 illustrates a process flow for synchronizing and provisioning testing data, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Data sanitization" or "sanitization" as used herein may refer to the removal of potentially sensitive information from production data for testing purposes. Examples of such sensitive information may include, for instance, personally identifiable information ("PII"), nonpublic information ("NPI"), data subject to regulations or standards (e.g., PCI DSS), or the like. Accordingly, data that has been through the sanitization process may be referred to as "sanitized data."

"Testing environment" or "lower level testing environment" ("LLE") as used herein may refer to a computing environment in which software or applications are developed, tested, and/or staged. Accordingly, applications within the LLE may require testing data to ensure the functionality and stability of the applications and features in development.

"Production environment" as described herein may refer to a computing environment in which the computing systems within the environment are currently in use to service the entity's operations. Accordingly, applications that have been deployed to the production environment may be considered to be "live."

Applications in the development phase may require large amounts of data for testing purposes. That said, conventional test data provisioning systems may be prone to a variety of issues that may impact the testing process. For instance, delays in producing sanitized test data that may be pushed to the lower level environment may in turn delay the progress of the application's development. The non-integrated or incomplete nature of conventional testing data may make it difficult to perform integration testing across multiple applications. Furthermore, as time progresses, old testing data may no longer be reflective of the types of data that will actually be processed by the testing applications once deployed to the production environment.

Accordingly, the system may be in operative communication with one or more applications within the production environment to capture data to be processed for testing ("production data") from the one or more applications. The system may continuously, at regular intervals (e.g., daily), pull copies of the production data from the one or more applications in the production environment. The system may then execute a sanitization process on the production data whereby the system removes potentially sensitive information from the production data. In some embodiments, the sanitization process comprises deleting sensitive data from the production data and replacing the sensitive data with dummy placeholder data. For instance, if the sensitive data includes a real person's name, the sanitization process may replace the person's name with a non-identifying placeholder name (e.g., "Person A" or the like) for the purpose of application testing.

Once the production data has been sanitized, the system may further perform synchronization of the production data received across multiple applications. For instance, there may be inconsistencies or gaps in data between a first application and a second application (e.g., a name of a user profile found within the production data from the first application is inconsistent with a name of the same user profile found within the production data from the second application). Accordingly, the system may aggregate the production data received from the one or more production applications and generate synchronized data (e.g., standardize entries to remove inconsistencies and fill in gaps in data). By synchronizing data in this manner, the system may facilitate cross-application testing by ensuring that the testing data has been standardized.

Production data that has been sanitized and synchronized may be referred to as "testing data." The testing data may be stored within a testing data repository for use by the users (e.g., application developers) and/or applications within the lower level environment. In some embodiments, data from the testing data repository may be pulled by the users and/or applications. In such embodiments, the testing data may be pulled on an on-demand basis or automatically at regular intervals depending on the development needs of the application. In other embodiments, the testing data may be pushed to the applications within the lower level environment automatically and continuously at set intervals (e.g., daily). The system may iteratively perform the process as described above to ensure that the testing data repository is always populated with current testing data that most closely matches the type of data that the testing applications will process once the testing applications are deployed to the production environment.

An exemplary embodiment is provided for illustrative purposes. In one embodiment, an entity such as a financial institution may use the system to pull copies of transaction data from each of a first application and a second application within the production environment. The transaction data may include, for instance, an account name, account address, contact information, transaction amount, direction of the transaction (e.g., incoming vs. outgoing), date and time of the transaction, transaction metadata (e.g., name of third party institutions), and the like. Once the transaction data has been pulled from both the first application and second application, the system may perform sanitization of the transaction data (e.g., replace the account name, account address, and contact information with placeholder data).

The system may then perform synchronization of the transaction data from the first application with the transaction data from the second application. For instance, the transaction data from the first application may have a different spelling for the account name when compared to the transaction data from the second application. Furthermore, the transaction data from the second application may be missing transaction metadata (e.g., name of the third party institution for the transaction). In such a scenario, the system may consolidate the transaction data from both applications to generate synchronized testing data based on the transaction. In particular, the synchronized testing data may eliminate inconsistencies in data entries (e.g., the account name) and fill in incomplete or missing data (e.g., transaction metadata). Once the synchronization has been performed, the transaction data may be stored within the testing data repository, where the transaction data may be used by the applications in the lower level environment for testing purposes.

The system as described herein confers a number of technological advantages over conventional testing data provisioning systems. By continuously pulling copies of production data from the production environment, the system ensures that testing data is current and most accurately reflects the type of data that will eventually be processed by the testing applications once deployed in production, and further ensures the availability of testing data (e.g., removes lag time in handling requests for testing data from the lower level environment). The sanitization processes as described herein ensure that sensitive information is not permitted to enter the lower level environment. Finally, the synchronization of testing data reduces the incidence of errors or challenges when performing integration testing across multiple applications (e.g., incompatibility caused by incomplete or non-integrated data).

Turning now to the figures, FIG. 1 illustrates an operating environment 100 for the testing data provisioning system, in accordance with one embodiment of the present disclosure. In particular, FIG. 1 illustrates a testing data provisioning system 104 that is operatively coupled, via a network, to a production computing system 103 and a lower level environment computing system 106. In such a configuration, the testing data provisioning system 104 may transmit information to and/or receive information from the production computing system 103 and/or the lower level environment computing system 106. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, in some embodiments, the functions of the lower level environment computing system 106 and the testing data provisioning system 104 may be performed by a single computing system. Furthermore, a single system, device, or server as depicted in FIG. 1 may represent multiple systems, devices, or servers. For instance, though the production computing system 103 and lower level environment computing system 106 are each depicted as single units, the operating environment may comprise multiple production computing systems 103 within the production environment and/or multiple lower level environment computing systems 106 within the lower level environment.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

The testing data provisioning system 104 may be a computing system that performs the testing data provisioning, synchronization, and sanitization processes as described elsewhere herein. Accordingly, the testing data provisioning system 104 may be a server on the network, though it is within the scope of the disclosure for the testing data provisioning system 104 to be any other type of computing system as described herein. The testing data provisioning system 104 may comprise a processing device 174 operatively coupled to a communication device 172 and a memory device 176, where the memory device 176 may comprise data storage 178 and computer readable instructions 180. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The computer readable instructions 180 of the testing data provisioning system 104 may comprise a testing data provisioning application 184 which may aggregate data from the production computing system 103, transform the data as provided herein, and provision the transformed data to the lower level environment computing system 106.

In this regard, a testing data repository 182 may be stored within the data storage 178 of the testing data provisioning system 104, where the testing data repository 182 may contain testing data (e.g., production data that has been synchronized and sanitized by the testing data provisioning system 104). The testing data repository 182 may be updated on a regular basis as described elsewhere herein. The lower level environment computing system 106 may, in some embodiments, be configured to access the testing data repository and pull the sanitized and synchronized testing data. In other embodiments, the testing data provisioning system 104 may push testing data from the testing data repository 182 to the lower level environment computing system 106.

The production computing system 103 may be a computing system within the production environment of an entity's networked systems and is currently being used by the entity to execute processes related to the entity's objectives. In some embodiments, the production computing system 103 may be a computing device operated by a user, such as an administrator, agent, or employee of the entity. In such embodiments, the production computing system 103 may be a device such as a desktop computer, laptop, IoT device, smartphone, tablet, single-board computer, or the like, and may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like). In other embodiments, the production computing system 103 may be a "headless" computing device such as a networked server.

The production computing system 103 may comprise a processing device 134 operatively coupled to a communication device 132 and a memory device 136 having data storage 138 and computer readable instructions 140 stored thereon, where the computer readable instructions 140 may comprise a production application 144. The production application 144 may be a currently deployed application that may store and/or process various types of application-related data (e.g., production data). In this regard, the testing data provisioning system 104 may be configured to generate copies of the production data within the production computing system 103 and transform the production data into testing data using the processes as described elsewhere herein.

The lower level environment computing system 106 may be a computing system which may be used within the lower level environment of an entity's network for the purpose of developing and testing software applications. Accordingly, the lower level environment computing system 106 may comprise a communication device 152, a processing device 154, and a memory device 156 which may comprise data storage 158. The lower level environment computing system 106 may be a device such as a networked server, desktop computer, terminal, kiosk, or any other type of computing system as described herein.

The processing device 154 may be operatively coupled to the communication device 152 and the memory device 156 such that the processing device 154 uses the communication device 152 to communicate with the network and other devices on the network, such as, but not limited to the production computing system 103 and the testing data provisioning system 104. In this regard, the communication device 152 generally comprises a modem, antennae, WiFi or Ethernet adapter, radio transceiver, or other device for communicating with other devices on the network.

The memory device 156 may have computer-readable instructions 160 stored thereon, where the computer readable instructions 160 further comprises a testing application 162. The testing application 162 may be an application that is currently in development and being tested before being deployed to the production environment. Accordingly, the lower level environment computing system 106 may receive testing data from the testing data repository 182 for the purposes of conducting the application testing.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 for synchronizing and provisioning testing data, in accordance with some embodiments of the present disclosure. The process 200 begins at block 201, where the system continuously retrieves production data from one or more computing systems in a production environment. The production data may comprise the types of data that may be useful for testing applications during application development. For instance, if the application being developed is a user account management application, the production data may include information such as a user name, user profile, account information, contact information, and the like. The system may continuously retrieve production data at regular intervals (e.g., every 12 hours, 24 hours, or the like) and perform the processes described herein to produce the testing data. By pulling data from the production environment in this way, the system may ensure the availability of current, relevant testing data for use in the application testing process.

The process continues to block 202, where the system executes a synchronization process on the production data. As part of the synchronization process, the system may perform consolidation of multiple, duplicate data entries and/or replace missing or incomplete information within the production data. In an exemplary embodiment, the system may pull information associated with a user profile (e.g., user account name, account number, transaction information, contact information, or the like) from multiple applications in the production environment (e.g., a first production application and a second production application). Information received from the first production application may be referred to as a "first data set" and information received from the second production application may be referred to as a "second data set." The system may detect a mismatch between the first data set received from the first production application and the second data set received from the second production application (e.g., the first data set and second data set refer to the same user profile, but the user account name from the first data set is spelled differently from the user account name from the second data set). In response to detecting the mismatch, the system may consolidate the production data from the first production application and second production application into a consolidated data set.

Continuing the above example, the system may further detect, based on comparing the first data set with the second data set, that the first data set is incomplete. For instance, the second data set may contain a data entry (e.g., an e-mail address of the user) that is missing from the first data set. In such a scenario, the system may consolidate the first data set with the second data set to fill gaps in the first data set. The synchronization process as described above may be continuously conducted in a bi-directional manner (e.g., from production applications to the system and from the system to the production applications) to ensure that the testing data remains in sync with all applications in the production environment.

The process continues to block 203, where the system executes a sanitization process on the production data. During the sanitization process, the system may identify one or more data entries containing sensitive information within the production data. Examples of sensitive data entries may include data entries containing PII, NPI, or the like. In such embodiments, the system may replace the one or more data entries containing sensitive information with placeholder data entries. In this way, the system may ensure that sensitive information does not enter the lower level environment.

The process continues to block 204, where the system generates testing data based on executing the synchronization process and the sanitization process on the production data. In this regard, the testing data may refer to data that has been synchronized and sanitized for use in testing applications. The synchronization of the testing data may facilitate integration testing across multiple applications that may use the same types of data. For instance, by using synchronized data, a user account management application may be tested for interoperability with a transaction application.

The process continues to block 205, where the system stores the testing data within a testing data repository. The testing data repository may be continuously updated at regular intervals with testing data generated from sanitized and synchronized production data as described above.

Accordingly, the testing data repository may contain testing data which is reflective of the current state of the production environment, thereby ensuring the quality of the testing data over time.

The process concludes at block 206, where the system provisions the testing data to one or more testing applications within a lower level environment. In some embodiments, the testing data may be pulled from the testing data repository by the testing application and/or the developers of the testing application, In such embodiments, the system may comprise a data gateway through which developers may request data from the testing data repository. In this regard, the data gateway may be a graphical interface with various interface elements (e.g., radio buttons, text entry boxes, check boxes, pull-down menus, and the like) which may allow the developers to define the types of testing data to be requested. In such embodiments, the system may further comprise a data mining tool that may mine for production data which meets the testing criteria as set by the testing applications and/or developers. For example, the data mining tool may be used to obtain production data relating to a user profile which has been compromised in the past through cybersecurity attacks. Once the relevant data has been mined, the data may be processed according to the functions described above to generate the necessary testing data. In other embodiments, the data mining tool may search within the testing data repository to identify testing data that fits the developer's criteria.

In other embodiments, the testing data may be pushed from the testing repository to the applications in the lower level environment in an automated manner at designated intervals. In this way, the system may provide an always-available, current, and efficient way to synchronize, sanitize, and provision testing data to testing applications.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for synchronization and provisioning of electronic testing data across applications, wherein the computer-implemented method comprises:
    continuously retrieving production data from one or more computing systems in a production environment;
    executing a synchronization process on the production data, wherein the synchronization process is a bidirectional process to synchronize the testing data with all applications in the production environment, wherein the synchronization process comprises:
        retrieving a first data set from a first production application in the production environment;
        retrieving a second data set from a second production application in the production environment;
        detecting, based on comparing the first data set with the second data set, that both the first data set and the second data set contain incomplete data entries; and
        based on detecting that both the first data set and the second data set contain incomplete data entries, merging the first data set with the second data set to populate the incomplete data entries of the first data set and of the second data set;
    executing a sanitization process on the production data;
    generating the testing data based on executing the synchronization process and the sanitization process on the production data;
    storing the testing data within a testing data repository; and
    provisioning the testing data to one or more testing applications within a lower level environment.

2. The computer-implemented method according to claim 1, wherein executing the synchronization process on the production data comprises:
    retrieving a first data set from a first production application in the production environment;
    retrieving a second data set from a second production application in the production environment;
    detecting a mismatch between the first data set and the second data set; and
    based on detecting the mismatch, merging the first data set with the second data set to form a consolidated data set.

3. The computer-implemented method according to claim 1, wherein executing the sanitization process on the production data comprises:
    detecting that one or more data entries within the production data contain sensitive information; and
    replacing the one or more data entries with placeholder data.

4. The computer-implemented method according to claim 1, wherein provisioning the testing data comprises:
    presenting a user interface of a data gateway to a user within the lower level environment;
    receiving, from the user, one or more criteria for the testing data;
    retrieving, a subset of the testing data corresponding to the one or more criteria; and
    transmitting the subset of the testing data to a testing computing system within the lower level environment.

5. The computer-implemented method according to claim 4, wherein the user interface comprises one or more interface elements through which the user may provide the one or more criteria for the testing data.

6. The computer-implemented method according to claim 1, wherein provisioning the testing data comprises pushing the testing data from the testing data repository to a testing computing system within the lower level environment at designated intervals.

7. A system for synchronization and provisioning of electronic testing data across applications, the system comprising:
    a memory device with computer-readable program code stored thereon;
    a communication device; and
    a processing device operatively coupled to the memory device and the communication device, wherein the processing device is configured to execute the computer-readable program code to:
        continuously retrieve production data from one or more computing systems in a production environment;
        execute a synchronization process on the production data, wherein the synchronization process is a bidirectional process to synchronize the testing data with all applications in the production environment, wherein the synchronization process comprises:
            retrieving a first data set from a first production application in the production environment;
            retrieving a second data set from a second production application in the production environment;
            detecting, based on comparing the first data set with the second data set, that both the first data set and the second data set contain incomplete data entries; and
            based on detecting that both the first data set and the second data set contain incomplete data entries, merging the first data set with the second data set to populate the incomplete data entries of the first data set and of the second data set;
        execute a sanitization process on the production data;

generate the testing data based on executing the synchronization process and the sanitization process on the production data;
store the testing data within a testing data repository; and
provision the testing data to one or more testing applications within a lower level environment.

8. The system according to claim 7, wherein executing the synchronization process on the production data comprises:
retrieving a first data set from a first production application in the production environment;
retrieving a second data set from a second production application in the production environment;
detecting a mismatch between the first data set and the second data set; and
based on detecting the mismatch, merging the first data set with the second data set to form a consolidated data set.

9. The system according to claim 7, wherein executing the sanitization process on the production data comprises:
detecting that one or more data entries within the production data contain sensitive information; and
replacing the one or more data entries with placeholder data.

10. The system according to claim 7, wherein provisioning the testing data comprises:
presenting a user interface of a data gateway to a user within the lower level environment;
receiving, from the user, one or more criteria for the testing data;
retrieving, via a data mining tool, a subset of the testing data corresponding to the one or more criteria; and
transmitting the subset of the testing data to a testing computing system within the lower level environment.

11. The system according to claim 10, wherein the user interface comprises one or more interface elements through which the user may provide the one or more criteria for the testing data.

12. The system according to claim 7, wherein provisioning the testing data comprises pushing the testing data from the testing data repository to a testing computing system within the lower level environment at designated intervals.

13. A computer program product for synchronization and provisioning of electronic testing data across applications, the computer program product comprising at least one non-transitory computer readable medium having computer-readable program code portions embodied therein, the computer-readable program code portions comprising executable code portions for:
continuously retrieving production data from one or more computing systems in a production environment;
executing a synchronization process on the production data, wherein the synchronization process is a bidirectional process to synchronize the testing data with all applications in the production environment, wherein the synchronization process comprises:
retrieving a first data set from a first production application in the production environment;
retrieving a second data set from a second production application in the production environment;
detecting, based on comparing the first data set with the second data set, that both the first data set and the second data set contain incomplete data entries; and
based on detecting that both the first data set and the second data set contain incomplete data entries, merging the first data set with the second data set to populate the incomplete data entries of the first data set and of the second data set;
executing a sanitization process on the production data;
generating the testing data based on executing the synchronization process and the sanitization process on the production data;
storing the testing data within a testing data repository; and
provisioning the testing data to one or more testing applications within a lower level environment.

14. The computer program product according to claim 13, wherein executing the synchronization process on the production data comprises:
retrieving a first data set from a first production application in the production environment;
retrieving a second data set from a second production application in the production environment;
detecting a mismatch between the first data set and the second data set; and
based on detecting the mismatch, merging the first data set with the second data set to form a consolidated data set.

15. The computer program product according to claim 13, wherein executing the sanitization process on the production data comprises:
detecting that one or more data entries within the production data contain sensitive information; and
replacing the one or more data entries with placeholder data.

16. The computer program product according to claim 13, wherein provisioning the testing data comprises:
presenting a user interface of a data gateway to a user within the lower level environment;
receiving, from the user, one or more criteria for the testing data;
retrieving, via a data mining tool, a subset of the testing data corresponding to the one or more criteria; and
transmitting the subset of the testing data to a testing computing system within the lower level environment.

17. The computer program product according to claim 13, wherein provisioning the testing data comprises pushing the testing data from the testing data repository to a testing computing system within the lower level environment at designated intervals.

* * * * *